United States Patent [19]
Sakaguchi et al.

[11] Patent Number: 4,764,980
[45] Date of Patent: Aug. 16, 1988

[54] SYSTEM FOR MEASURING DELAY TIME VARIATION IN OPTICAL FIBER DIGITAL COMMUNICATION SYSTEM

[75] Inventors: Haruo Sakaguchi; Norio Seki; Shu Yamamoto, all of Tokyo; Yoshinao Iwamoto, Saitama, all of Japan

[73] Assignee: Kokusai Denshin Denwa Co., Ltd., Tokyo, Japan

[21] Appl. No.: 820,348

[22] Filed: Jan. 21, 1986

[30] Foreign Application Priority Data

Jan. 22, 1985 [JP] Japan .................................. 60-8466

[51] Int. Cl.$^4$ ........................... H04B 9/00; H04J 1/16
[52] U.S. Cl. ................................ 455/601; 455/612; 370/15
[58] Field of Search ................. 455/601, 610, 612; 370/15; 379/3; 371/67, 71; 356/73.1

[56] References Cited

U.S. PATENT DOCUMENTS

| 4,247,934 | 1/1981 | Parras ................................ 370/15 |
| 4,271,513 | 6/1981 | Maejima et al. .................... 370/15 |
| 4,271,514 | 6/1981 | Parras et al. ....................... 370/15 |

FOREIGN PATENT DOCUMENTS 56-78247  6/1981  Japan .................................. 455/601

OTHER PUBLICATIONS

Sakaguchi et al., *Journal of Electronics and Communication in Japan*; "A Study on Branching Systems in Optical Fiber Submarine Cable Systems"; CS84-123; 1984; pp. 94-101.

*Primary Examiner*—Robert L. Griffin
*Assistant Examiner*—Andrew J. Telesz, Jr.
*Attorney, Agent, or Firm*—Armstrong, Nikaido, Marmelstein & Kubovcik

[57] ABSTRACT

Delay time variation in an optical fiber digital communication system which includes optical regenerative repeaters is measured at one of terminal ends having reference clock signal. A monitor signal which depends upon the delay time variation is provided at the farthest repeater in an area where delay time is subject to secular change by dividing reference clock signal from said terminal end, and said monitor signal is returned to the terminal end from said farthest repeater, and the terminal end compares the returned monitor signal with the divided reference signal by using a phase comparator to provide measure of delay time variation.

7 Claims, 5 Drawing Sheets

SYSTEM FOR MEASURING DELAY TIME VARIATION IN OPTICAL FIBER DIGITAL COMMUNICATION SYSTEM

BACKGROUND OF THE INVENTION

The present invention relates to system for measuring delay time variation in optical fiber digital communication system to prevent loss or slipping of information in a transmission system using optical fiber cable including an optical regenerative repeater.

Optical communication systems have drawn the attention of the public in recent years since it can handle enormous amounts of communication data. Because they are light in weight and economical, optical fiber cables are used as a transmission media in the optical communication system. However, optical fiber cables tend to easily expand, contract and bend depending upon external conditions. Especially expansion and contraction of optical fiber cables due to changes in external temperature will cause slippage or loss of information signal at multiplex end office during time-division multiplex communication.

When information signals which have been transmitted from two or more different points are going to be time-division multiplexed, expansion or contraction of the optical fiber cable from each point changes the propagation delay. When the phase difference of the information signal to the multiplex clock fluctuates more than 2 radian, such information slippage or loss occurs.

Therefore, various systems to detect variation in propagation delay time have been studied to compensate for this variation in propagation delay time.

As optical fiber submarine cable communication requires more reliability and economic efficiency than land optical fiber communication system, the propagation delay time variation detecting system is described taking the former as an example.

FIG. 5 shows one of the conventional transmission systems which economically provide communication among three or more signal transmitters and receivers (hereinafter called "Node"). For example, node A sends time-shared multiplexed information to node B and node C by the transmitter (1) via a fiber (3) and repeaters $R_1$, ---, and $R_L$. The signal branch unit (4) multiplexes and/or de-multiplexes signals and returns the signal via fiber (3'), repeaters $R'_L$---, and $R'_1$ to node A, and the receiver (2) releases the multiplication. (Sakaguchi et al, Journal of Electronics and Communication in Japan CS84-123, on pages 1 to 8, 1984)

In this example, since the signal branch unit (4) is installed in the sea, the clock source is not contained in said device (4) from a standpoint of equipment complexity, and therefore a communication reference clock signal is used as a clock signal for multiplexing, de-multiplexing in said branch unit (4). Therefore, the phase difference between a clock signal and a communication signal changes with time in said branch unit (4). Whenever the phase difference exceeds $2\pi$ radians, information loss or slippage occurs. The slippage causes the frame to be out of synchronization at a receive node. It is impossible to transmit correct information between each node until the frame synchronization is established.

The slippage occurs even in land cable when the delay time changes depending upon temperature change, pressure, change of wavelength of a light source. To avoid this slippage, a delay variation compensation is required. Three prior systems for the compensation are described below.

The first prior system is a pulse stuffing system which uses a clock signal with frequency higher than a communication clock signal. The system has a buffer memory to cancel delay time variation and adjust the number of insertion pulses to establish the synchronization of the two systems.

The second prior system has an independent clock source in branch unit to which each nodes are synchronized. The branch unit detects the phase difference between the reference clock signal in the branch unit itself and the receive clock signal to provide the delay time variation. The delay time compensation is carried out by using the measured phase difference, and thus the slippage or loss of information is prevented.

The third prior system uses the communication clock signal for multiplexing clock signal. For example, in a branch unit (4) in FIG. 5, clock signal which is extracted from communication signals from nodes C, A and B respectively is used as multiplexing clock signal for sending signals to those nodes. This system enables each node to compare the phase between transmission clock signal and receive clock signal, whereby nodes A, B and C can detect delay time variation between each nodes. The measured phase differences are informed to other nodes to calculate delay time variation between each node and device (4) so that the delay time compensation is performed.

The conventional examples to avoid loss or slippage have been described. We describe the problems when they are applied to an optical fiber submarine cable network system equipped with a time-division signal branch unit which is installed in the sea.

In conventional first and second examples, a stable and highly reliable clock source is required for multiplexing at the branch unit.

Though there have been currently atomic oscillators using cesium (Cz) and rubidium (Rb) as stable clock source, double or triple redundant structure is required to obtain high operational reliability when these oscillators are used. Accordingly the scale of equipment will be larger and it is not adequate to apply them to signal branch unit (4) in the submarine branch optical network system. In addition, the control for stuffing will be larger in the first examples.

In second and third examples, a variable delay circuit is required. For that purpose, a variable length coaxial pipe or other similar goods which expand mechanically must be used to adjust delay because it is difficult at present to use other variable delay circuits for high speed signals.

A coaxial pipe and variable delay device including a drive unit will be so large that it is difficult to mount them in the submarine signal branch unit (4). Instead they must be installed in end terminals for each node installed on land. In the second example, it is possible to compensate for delay at each node on land. However, to do this, a means for informing each node the delay time variation in a submarine signal branch unit (4) will be required, resulting in large signal branch unit (4).

In third example, it is possible to adjust delay at the node concerned without increasing the size of the submarine signal branch unit (4). However, this system has the following disadvantages: (i) a complicated operation of sending and receiving delay variation information between each node is required. (ii) Whe there is something wrong in a node, the measure of the delay time variation becomes impossible in the whole cable system.

SUMMARY OF THE INVENTION

It is an object, therefore, of the present invention to overcome the disadvantages and limitations of a prior delay time variation measure system by providing a new and improved delay time variation measure system.

It is also an object of the present invention to provide a delay time variation measure system which is high in operational reliability, simple in structure, and can measure delay time variation in each node independently, when it is used in a submarine optical fiber system having a branch unit which is installed in the sea.

The above and other objects are attained by a system for measuring delay time variation in an optical fiber digital communication system which includes optical regenerative repeaters, at one of terminal ends which has a reference clock signal, comprising; means for providing monitor signal by dividing said reference clock signal in an optical repeater which locates the farthest from said terminal end in an area where delay time is subject to secular change; return means for transmitting said monitor signal to said terminal end; and said terminal end having phase comparison means for comparing said monitor signal with divided reference signal.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
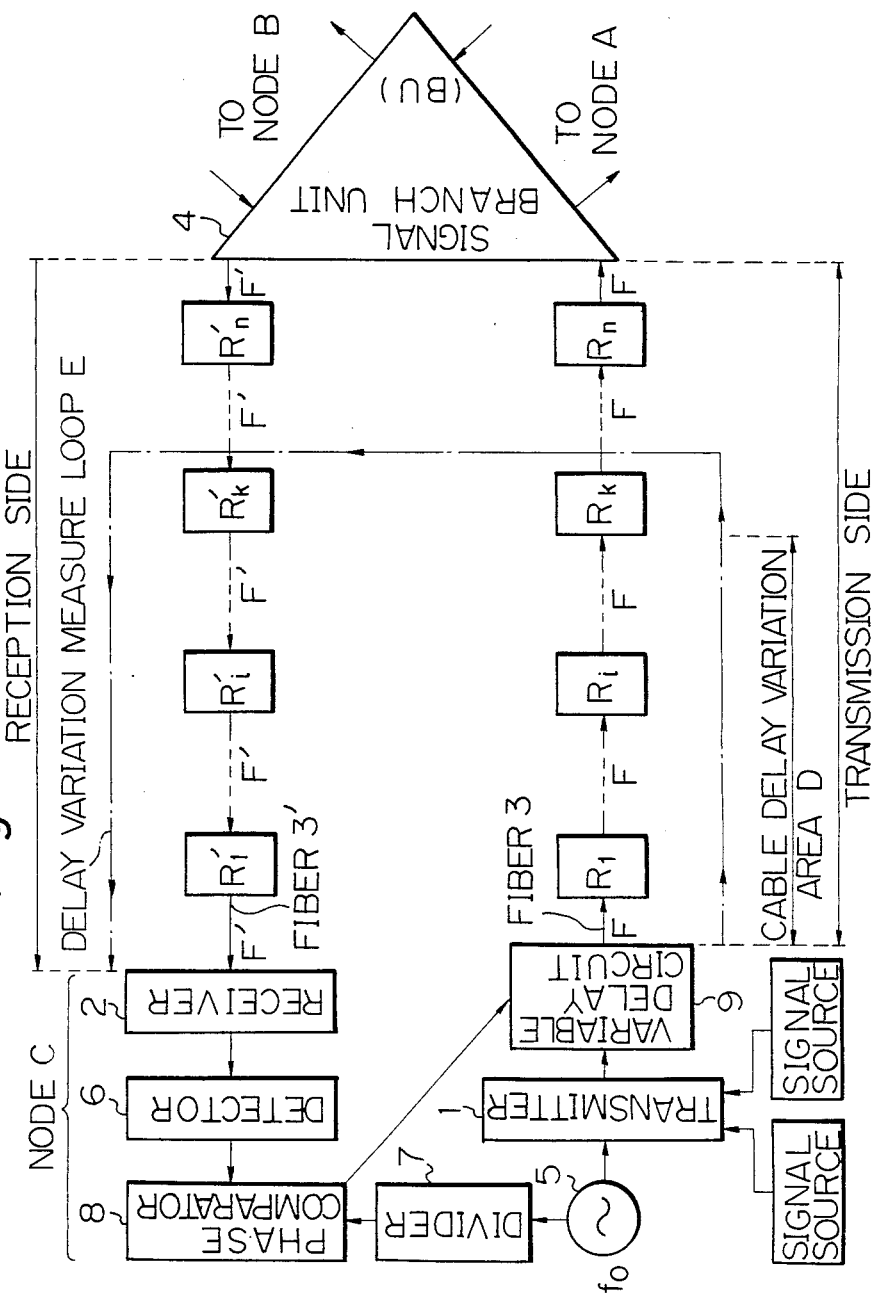
FIG. 1 is a block diagram of a delay time variation measure system according to the present invention.

FIG. 1 is a block diagram of the present invention. In the diagram, (5) is an oscillator to provide a reference clock signal with repetition frequency $f_0$, (1) is a transmitter for sending a time division multiplex signal to an optical fiber (3), (2) is a receiver for receiving a signal. The numeral (6) is a detector for detecting a monitor signal which is obtained by dividing said reference clock signal at the farthest repeater in the area D where the delay time variation is subject to secular change. The numeral (7) is a divider for dividing a reference signal $f_0$ at a terminal end, the numeral (8) is a phase comparator for providing phase difference between said monitor signal $S_{sv}$ and an output of said divider (7), the numeral (9) is a variable delay circuit to adjust delay of the reference clock signal according to the output of said phase comparator (8). The circuit (9) is implemented for instance by a variable length coaxial pipe, and is installed at the transmit side.

The temperature in sea water at deep portion is generally constant with time. Therefore expansion and contraction of cable which causes delay variation does not occur at deep portion. Therefore, area D which is subject to delay time variation can be theoretically determined according to depth of the sea, tidal current, latitude, etc., alternatively, by investigation of temperature at sea bottom before laying a cable.

A delay variation measuring loop E is defined by the transmitter (1), the nearest repeater $R_1$ to the transmitter (1), the farthest repeater $R_k$ from the transmitter (1) and said repeater $R_k$ being adjoined to the area D where the delay time variation is subject to secular change, another repeater $R_k'$ which locates farthest from the receiver (2) and said repeater $R_k'$ being adjoined to the area D, another repeater $R_1'$ located nearest to the receiver (2), and the receiver (2), as shown in FIG. 1.

The reference clock signal $f_0$ which is generated by the oscillator 5 is divided to lower frequency by the repeater $R_k$. The divided lower signal is a monitor signal $S_{sv}$ which represents the delay time variation in the area D. The monitor signal $S_{sv}$ is returned through the return path to the terminal end. The return path is composed of the farthest repeater $R_k'$ from the receiver (2) through the nearest repeater $R_1'$. The monitor signal $S_{sv}$ which is received by the receiver (2) is detected by the detector (6), the output of which is applied to the phase comparator (8). The phase comparator (8) compares the phase of the monitor signal $S_{sv}$ with the phase of the output of the divider 7 which provides the reference phase from the oscillator (5). The delay time variation thus obtained by the phase comparator (8) is the value in the whole loop E, therefore, the one-way delay time variation (transmit side, or receive side) is half of the output of the phase comparator (8). The variable delay circuit (9) is adjusted according to said one-way delay time variation to keep the delay time between the transmitter (1) and the branch unit (4) constant. Thus, the slippage or loss of information in the branch unit (4) is prevented.

Some modifications of the above embodiment are of course possible. For instance, the monitor signal $S_{sv}$ can be offset in the branch unit (4), alternately, in a repeater $R_n$ which locates immediately before the branch unit (4). Further, the variable delay circuit (9) may be inserted both in the transmit side, and the receive side, although the embodiment of FIG. 1 has the variable delay circuit only in the transmit side.

As explained above, the present invention enables a largesize variable delay circuit (9) such as variable length coaxial pipe which is difficult to mount in a submarine branch unit to be installed on land, and the delay variation can be simply and correctly measured.

Figure 2:
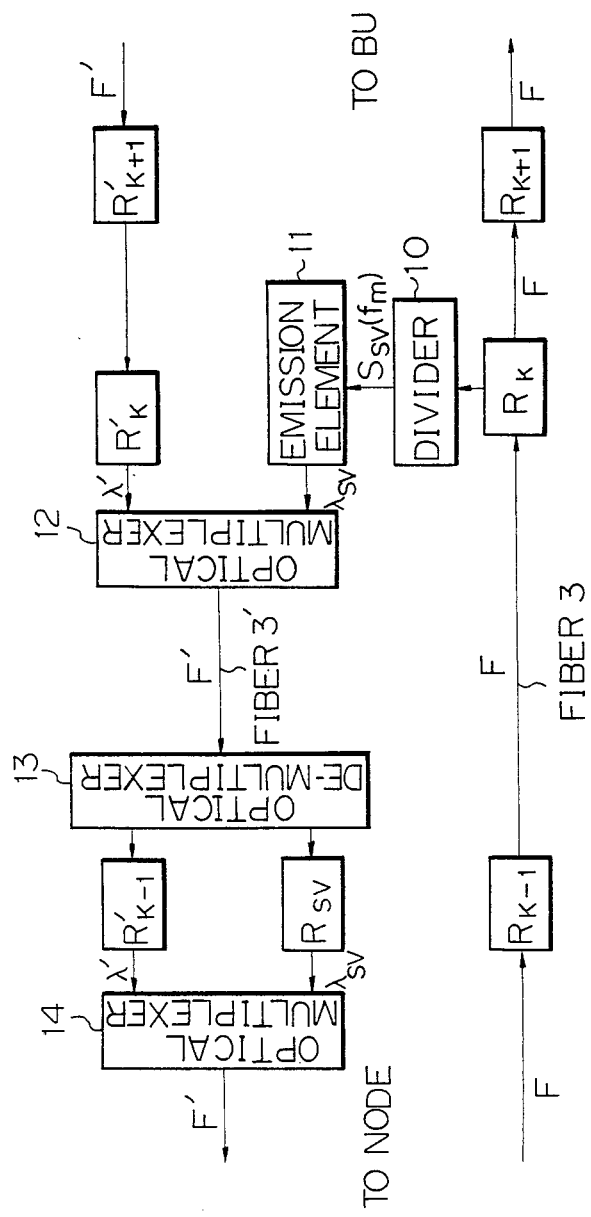
FIG. 2 is a block diagram of a return means which transmits a monitor signal from a repeater to a terminal end.
Figure 3:
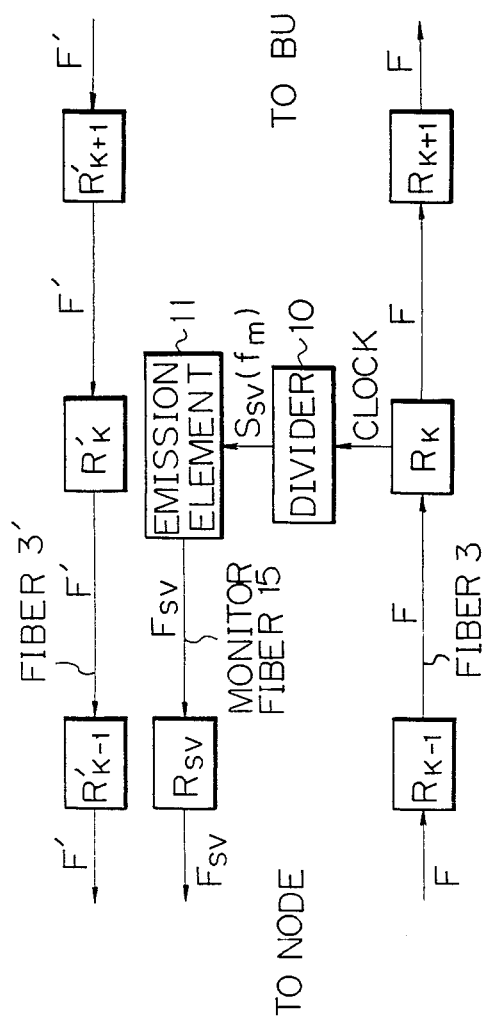
FIG. 3 is another block diagram of a return means.
Figure 4:
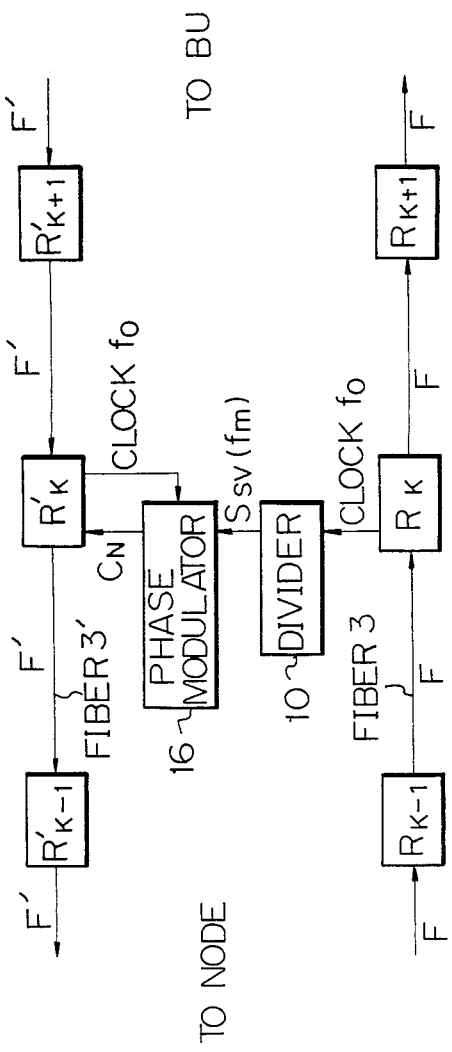
FIG. 4 is a still another block diagram of a return means.
Figure 5:
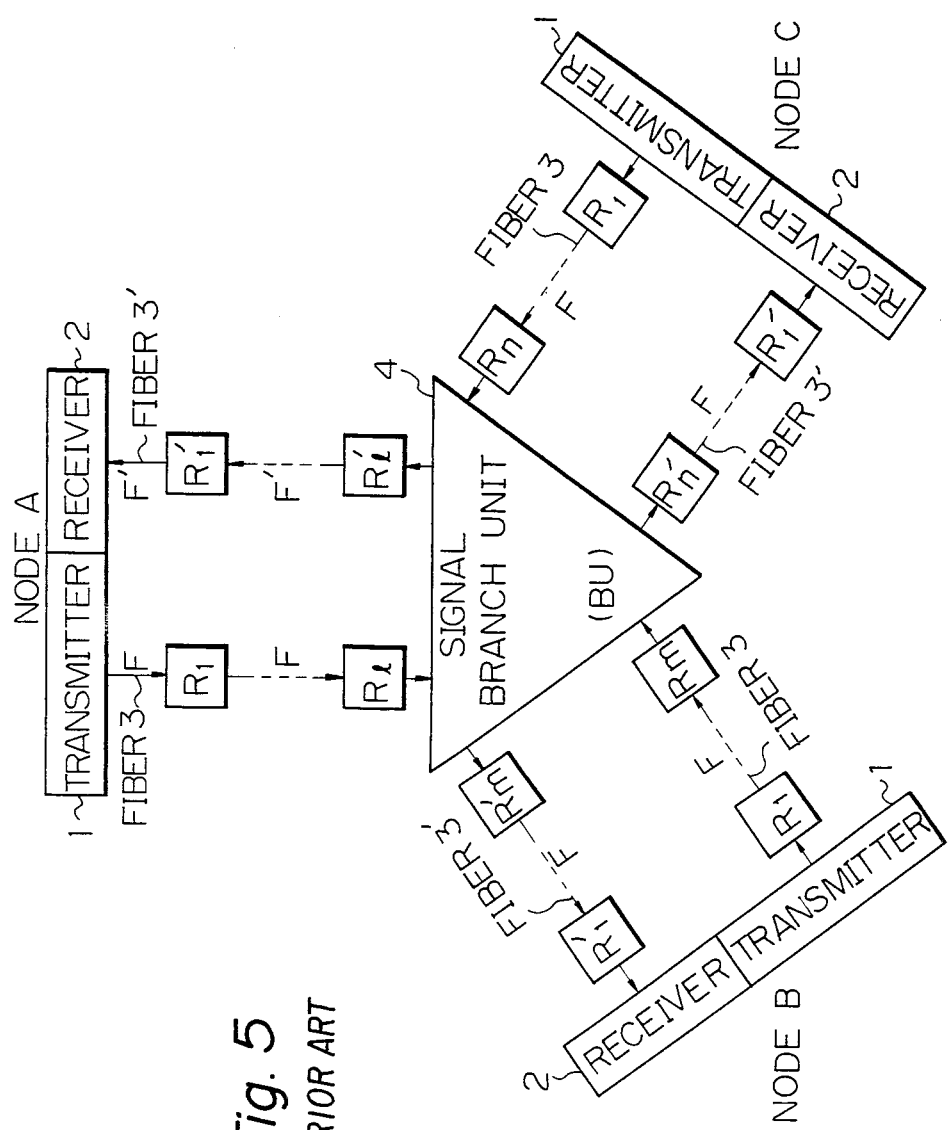
FIG. 5 is a block diagram of a submarine cable system which has a branch unit installed in the sea.

Next, a return path for returning the monitor signal $S_{sv}$ is described in accordance with FIGS. 2 through 4.

FIG. 2 shows a block diagram of offset means of a monitor signal in a repeater. A clock signal component based upon the reference clock signal $f_0$ from each node through the optical fiber (3) and the repeaters $R_i$ (i=1 through k−1) is applied to the repeater $R_k$ which returns the monitor signal $S_{sv}$. The repeater $R_k$ has a frequency divider (10), which divides the frequency of the reference clock signal $f_0$ to the frequency $f_m$. The divided frequency $f_m$ is the monitor signal $S_{sv}$. The monitor signal $S_{sv}$ is converted to an optical signal by a light emitting element (11) which provides the wavelength $\lambda_{sv}$. The monitor light signal which is the output of the element (11) is multiplexed with the communication light signal which has the wavelength λ' in the optical multiplexer (12). The output of the optical multiplexer (12) is transmitted to the adjacent repeater $R_{k-1}$ through the optical fiber 3'. In the repeater $R_{k-1}$, the optical de-multiplexer (13) separates the communication light from the monitor light. The communication light is regenerated by a conventional optical repeater circuit $R_{k-1}'$, and the monitor light is amplified by an analog type repeater circuit $R_{sv}$. The outputs of the repeater circuits are converted to light signals with the wavelength λ and $\lambda_{sv}$ which differs from λ', then, those wavelengths are multiplexed in the optical multiplexer (14). The output of the multiplexer (14) is transmitted to the next repeater through the optical cable 3'. The monitor signal $S_{sv}$ is sent to the terminal end by repeating the above operation.

FIG. 3 is a block diagram of return means of another embodiment according to the present invention. In FIG. 3, the monitor signal $S_{sv}$ is obtained through similar manner to that of FIG. 2 by using a divider (10). The monitor signal $S_{sv}$ is converted to a light signal by the emission element (11), the output of which is transmitted to the adjacent repeater through the specific optical fiber $F_{sv}$ which differs from the communication fiber F'. The monitor signal $S_{sv}$ is amplified by an analog type repeater $R_{sv}$, which is not a regenerative repeater but amplifies merely the signal level.

FIG. 4 is a block diagram of still another embodiment of a return means according to the present invention, in which the monitor signal $S_{sv}$ is produced by similar manner to that of FIG. 2 and/or FIG. 3. In FIG. 4, the reference clock signal with the frequency $f_0$ is modulated through phase modulation by the modulation signal $S_{sv}$ which is the monitor signal. The phase modulation is accomplished by the phase modulator (16). The phase modulated reference clock signal $C_n$ is used as a reference clock signal in the repeaters in the return path. Thus, the phase modulated reference clock signal which has the information of the monitor signal $S_{sv}$ is sent to the terminal end, which takes the monitor signal $S_{sv}$ through the phase detection of the reception reference clock signal.

It should be appreciated that the return path to send a monitor signal $S_{sv}$ has the same importance as that of the main communication signal, and the return path must operate with very high operational reliability. In the embodiments of FIGS. 2 and 3, the light emission element must be a light emission diode (LED), and a receiver must use a photo-diode (PD) to provide high operational reliability. As an LED has the disadvantage that the signal to noise ratio (S/N) of the receive monitor signal $S_{sv}$ is not good because of the spectrum dispersion and the material variance of a fiber, it is preferable that the frequency $f_m$ of the monitor signal $S_{sv}$ is low as compared with that of the communication signal by using a high ratio frequency divider. When the length between adjacent repeaters is 50 km, and the wavelength of the light emission diode (LED) is 1.3 μm, or 1.5 μm, the transmission bandwidth $f_c$ is 17 MHz, or 4 MHz. Accordingly, said disadvantage of the deterioration of S/N is overcome by using the monitor signal $S_{sv}$ with the frequency lower than said bandwith $f_c$. Further, as the monitor signal $S_{sv}$ is single frequency signal which has no bandwidth, an amplifier for the amplification of the monitor signal may be narrow band amplifier, and therefore, the thermal noise of an amplifier may be small. Further, as the monitor signal $S_{sv}$ is low speed signal (low frequency signal), a conventional high reliable analog amplifier is used.

In case of FIG. 4 embodiment where phase modulated clock signal $C_n$ is transmitted, the modulation signal frequency $f_m$ is selected so that the relations $$f_m < f_0 < 2Q$$

is satisfied, where $f_0$ is frequency of reference clock signal, Q is the selectivity of a timing signal derive circuit, and $f_0/2Q$ is the 3dB bandwith of a timing signal derive circuit. Thus, the deterioration of the S/N of the monitor signal is overcome by selecting the frequency $f_m$ of the modulation signal, considering said equation and the loss of the monitor signal in the transmission path to the terminal end. Further, the signal quality of the main communication signal does not deteriorate when the modulation index of the phase modulation is properly designed. The embodiment of FIG. 4 has the advantage that the operational reliability of the return path is quite high, since the transmission of the monitor signal in the return path is accomplished by the common circuit for the main communication signal. It should be appreciated that the clock signal $f_0$ in the receive path may be different from that of the transmit path, although the embodiments use the common frequency $f_0$ both in the receive path and the transmit path.

As described above in detail, the present invention has the advantages that the delay time variation in each node is measured accurately without using a large scale signal branch unit which is installed in the sea. Accordingly, the present invention may provide a simple optical submarine cable system which has a signal branch unit in the sea. Further, the present invention is applicable not only to a submarine cable system, but also to a land-mount time division multiplex system which multiplexes more than two signals, which are subject to delay time variation.

From the foregoing, it will now be apparent that a new and improved delay time variation measuring system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. In an optical fiber digital communication system which includes optical regenerative repeaters, optical fiber transmission lines and at least one terminal end, a system for on-line measuring signal delay time variation of a transmission line at said one terminal end which has reference clock signal, said system comprising:

means for generating a monitor signal in an optical repeater by dividing a repetition frequency of said reference clock signal that is extracted from an information signal transmitted from said one terminal end;

return means for transmitting said monitor signal to said one terminal end;

said one terminal end having phase comparison means for comparing said monitor signal with a second reference signal that is obtained by dividing the repetition frequency of said reference clock signal at said one terminal end.

2. A system for measuring signal delay time variation of a transmission line according to claim 1, wherein said return means has a second transmission path which differs from a first communication transmission path that carries said information signal, said monitor signal is transmitted by wavelength division multiplex method through said second transmission path to return to said one terminal end.

3. A system for measuring signal delay time variation of a transmission line according to claim 1, wherein said return means has an optical fiber together with optical repeaters only for said monitor signal.

4. A system for measuring signal delay time variation of a transmisssion line according to claim 1, wherein said return means has phase mdoulation means for phase modulation of a transmission clock signal by said monitor signal, wherein the transmission clock signal is extracted from an information signal by a timing circuit in said optical regenerative repeater.

5. A system for measuring signal delay time variation of a transmission line according to claim 1, wherein said optical repeater, which provides a monitor signal, is located at the farthest from said one terminal end in which the repeaters are located in an area where signal delay time is subject to secular change.

6. A system for measuring signal delay time variation of a transmission line according to claim 1, wherein the frequency of said monitor signal is lower than a bandwidth $f_c$ determined by the spectral width of the optical source and fiber for said monitor signal transmission.

7. A system for measuring signal delay time variation of a transmission line according to claim 1, wherein the frequency of said monitor signal is lower than 17 MHz.

* * * * *